United States Patent [19]

Foster et al.

[11] Patent Number: 6,075,881
[45] Date of Patent: Jun. 13, 2000

[54] MACHINE VISION METHODS FOR IDENTIFYING COLLINEAR SETS OF POINTS FROM AN IMAGE

[75] Inventors: Nigel John Foster, Newton; Jane Alice Loizeaux, Lowell, both of Mass.

[73] Assignee: Cognex Corporation, Natick, Mass.

[21] Appl. No.: 08/820,691

[22] Filed: Mar. 18, 1997

[51] Int. Cl.$^7$ ....................................................... G06K 9/00
[52] U.S. Cl. ........................... 382/141; 382/206; 382/286
[58] Field of Search ..................................... 382/100, 151, 382/152, 153, 141, 171, 203, 154, 206, 276, 281, 286; 702/150, 151, 155, 156; 348/86

[56] References Cited

U.S. PATENT DOCUMENTS

| | | |
|---|---|---|
| 3,816,722 | 6/1974 | Sakoe et al. . |
| 3,936,800 | 2/1976 | Ejiri et al. . |
| 3,967,100 | 6/1976 | Shimomura . |
| 3,968,475 | 7/1976 | McMahon . |
| 3,978,326 | 8/1976 | Shimomura . |
| 4,011,403 | 3/1977 | Epstein et al. . |
| 4,115,702 | 9/1978 | Nopper . |
| 4,115,762 | 9/1978 | Akiyama et al. . |
| 4,183,013 | 1/1980 | Agrawala et al. . |
| 4,200,861 | 4/1980 | Hubach et al. . |
| 4,254,400 | 3/1981 | Yoda et al. . |
| 4,286,293 | 8/1981 | Jablonowski . |
| 4,300,164 | 11/1981 | Sacks . |
| 4,385,322 | 5/1983 | Hubach et al. . |
| 4,435,837 | 3/1984 | Abernathy . |
| 4,441,124 | 4/1984 | Heebner et al. . |
| 4,441,206 | 4/1984 | Kuniyoshi et al. . |
| 4,519,041 | 5/1985 | Fant et al. . |
| 4,534,813 | 8/1985 | Williamson et al. . |
| 4,541,116 | 9/1985 | Lougheed . |
| 4,570,180 | 2/1986 | Baier et al. . |
| 4,577,344 | 3/1986 | Warren et al. . |
| 4,581,762 | 4/1986 | Lapidus et al. . |
| 4,606,065 | 8/1986 | Beg et al. . |
| 4,617,619 | 10/1986 | Gehly . |

(List continued on next page.)

FOREIGN PATENT DOCUMENTS

| | | |
|---|---|---|
| 0527 632 A2 | 2/1993 | European Pat. Off. . |
| 0 777 381 A2 | 11/1996 | European Pat. Off. . |
| WO 95/21376 | 8/1995 | WIPO . |
| WO 95/22137 | 8/1995 | WIPO . |
| WO 97/21189 | 6/1997 | WIPO . |
| WO 97/22858 | 6/1997 | WIPO . |
| WO 97/24692 | 7/1997 | WIPO . |
| WO 97/24693 | 7/1997 | WIPO . |
| WO 98/52349 | 11/1998 | WIPO . |
| WO 99/15864 | 4/1999 | WIPO . |
| WO 98/59490 | 12/1999 | WIPO . |

OTHER PUBLICATIONS

Grimson, W. Eric L. and Huttenlocher, Daniel P., "On the Sensitivity of the Hough Transform for Object Recognition", May 1990, IEEE Transactions on Pattern Analysis and machine Intelligence, vol. 12, No. 3.

Medina–Mora et al. (1981) An Incremental Programming Environment, IEEE Transactions on Software Eng. SE–7:472–482.

Teitelbaum et al. (19810 The Cornell Program Synthesizer: A Syntax–Directed Programming Environment, Communications of the ACM 24:563–573.

(List continued on next page.)

Primary Examiner—Bhavesh Mehta
Attorney, Agent, or Firm—David J. Powsner; Russ Weinzimmer

[57] ABSTRACT

The invention provides a two-phase method for identifying sets of collinear points in data points, e.g., derived from an image. During a first phase, the "angle-finding" phase, the angular orientation of the lines defined by the sets of points is estimated. During a second phase, the "line-finding" phase, sets of collinear points aligned at that angle are identified. The invention has application, for example, in finding parallel and perpendicular point sets in an image.

17 Claims, 7 Drawing Sheets

U.S. PATENT DOCUMENTS

| | | |
|---|---|---|
| 4,630,306 | 12/1986 | West et al. . |
| 4,641,349 | 2/1987 | Flom et al. . |
| 4,688,088 | 8/1987 | Hamazaki et al. . |
| 4,706,168 | 11/1987 | Weisner . |
| 4,707,647 | 11/1987 | Coldren et al. . |
| 4,728,195 | 3/1988 | Silver . |
| 4,730,260 | 3/1988 | Mori et al. . |
| 4,731,858 | 3/1988 | Grasmueller et al. . |
| 4,736,437 | 4/1988 | Sacks et al. . |
| 4,742,551 | 5/1988 | Deering . |
| 4,752,898 | 6/1988 | Koening ................................. 364/559 |
| 4,758,782 | 7/1988 | Kobayashi . |
| 4,764,870 | 8/1988 | Haskin . |
| 4,771,469 | 9/1988 | Wittenburg . |
| 4,776,027 | 10/1988 | Hisano et al. . |
| 4,782,238 | 11/1988 | Radl et al. . |
| 4,783,826 | 11/1988 | Koso ..................................... 382/141 |
| 4,783,828 | 11/1988 | Sadjadi . |
| 4,783,829 | 11/1988 | Miyakawa et al. . |
| 4,809,077 | 2/1989 | Norita et al. . |
| 4,831,580 | 5/1989 | Yamada . |
| 4,860,374 | 8/1989 | Murakami et al. .................... 382/282 |
| 4,860,375 | 8/1989 | McCubbrey et al. . |
| 4,876,457 | 10/1989 | Bose ..................................... 250/563 |
| 4,876,728 | 10/1989 | Roth . |
| 4,891,767 | 1/1990 | Rzasa et al. . |
| 4,903,218 | 2/1990 | Longo et al. . |
| 4,907,169 | 3/1990 | Lovoi . |
| 4,912,559 | 3/1990 | Ariyoshi et al. . |
| 4,914,553 | 4/1990 | Hamada et al. . |
| 4,922,543 | 5/1990 | Aknhlbom et al. . |
| 4,926,492 | 5/1990 | Tanakan et al. . |
| 4,932,065 | 6/1990 | Feldgajer . |
| 4,953,224 | 8/1990 | Ichinose et al. . |
| 4,955,062 | 9/1990 | Terui . |
| 4,959,898 | 10/1990 | Landman et al. . |
| 4,962,423 | 10/1990 | Yamada et al. . |
| 4,972,359 | 11/1990 | Silver et al. . |
| 4,982,438 | 1/1991 | Usami et al. . |
| 5,012,402 | 4/1991 | Akiyama . |
| 5,012,524 | 4/1991 | LeBeau . |
| 5,024,419 | 6/1991 | Davis . |
| 5,046,190 | 9/1991 | Daniel et al. . |
| 5,054,096 | 10/1991 | Beizer . |
| 5,060,276 | 10/1991 | Morris et al. . |
| 5,063,608 | 11/1991 | Soege . |
| 5,073,958 | 12/1991 | Imme . |
| 5,081,656 | 1/1992 | Baker et al. . |
| 5,081,689 | 1/1992 | Meyer et al. . |
| 5,086,478 | 2/1992 | Kelly-Mahaffey et al. . |
| 5,090,576 | 2/1992 | Menten . |
| 5,091,861 | 2/1992 | Geller et al. . |
| 5,091,968 | 2/1992 | Higgins et al. . |
| 5,093,867 | 3/1992 | Hori et al. . |
| 5,113,565 | 5/1992 | Cipolla et al. ........................ 382/141 |
| 5,115,309 | 5/1992 | Hang . |
| 5,119,435 | 6/1992 | Berkin . |
| 5,124,622 | 6/1992 | Kawamura et al. . |
| 5,133,022 | 7/1992 | Weideman . |
| 5,134,575 | 7/1992 | Takagi . |
| 5,143,436 | 9/1992 | Baylor et al. . |
| 5,145,432 | 9/1992 | Midland et al. . |
| 5,151,951 | 9/1992 | Ueda et al. . |
| 5,153,925 | 10/1992 | Tanioka et al. . |
| 5,155,775 | 10/1992 | Brown . |
| 5,159,281 | 10/1992 | Hedstrom et al. . |
| 5,159,645 | 10/1992 | Kumagai . |
| 5,164,994 | 11/1992 | Bushroe . |
| 5,168,269 | 12/1992 | Harlan . |
| 5,179,419 | 1/1993 | Palmquist et al. . |
| 5,185,810 | 2/1993 | Freischlad ............................. 382/141 |
| 5,185,855 | 2/1993 | Kato et al. . |
| 5,189,712 | 2/1993 | Kajiwara et al. . |
| 5,206,820 | 4/1993 | Ammann et al. . |
| 5,216,503 | 6/1993 | Paik . |
| 5,225,940 | 7/1993 | Ishii et al. . |
| 5,230,027 | 7/1993 | Kikuchi . |
| 5,243,607 | 9/1993 | Masson et al. . |
| 5,253,306 | 10/1993 | Nishio . |
| 5,253,308 | 10/1993 | Johnson . |
| 5,265,173 | 11/1993 | Griffin et al. . |
| 5,271,068 | 12/1993 | Ueda et al. . |
| 5,287,449 | 2/1994 | Kojima . |
| 5,297,238 | 3/1994 | Wang et al. . |
| 5,297,256 | 3/1994 | Wolstenholme et al. . |
| 5,299,269 | 3/1994 | Gaborski et al. . |
| 5,307,419 | 4/1994 | Tsujino et al. ........................ 382/100 |
| 5,311,598 | 5/1994 | Bose et al. . |
| 5,315,388 | 5/1994 | Shen et al. . |
| 5,319,157 | 6/1994 | Nakahashi et al . . |
| 5,327,156 | 7/1994 | Masukane et al. . |
| 5,329,469 | 7/1994 | Watanabe . |
| 5,337,262 | 8/1994 | Luthi et al. . |
| 5,337,267 | 8/1994 | Colavin . |
| 5,363,507 | 11/1994 | Nakayama et al. . |
| 5,367,439 | 11/1994 | Mayer et al. . |
| 5,367,667 | 11/1994 | Wahlquist et al. . |
| 5,371,690 | 12/1994 | Engel et al. . |
| 5,388,197 | 2/1995 | Rayner . |
| 5,388,252 | 2/1995 | Dreste et al. . |
| 5,398,292 | 3/1995 | Aoyama . |
| 5,418,892 | 5/1995 | Aghajan et al. ...................... 395/128 |
| 5,432,525 | 7/1995 | Maruo et al. . |
| 5,440,699 | 8/1995 | Farrand et al. . |
| 5,455,870 | 10/1995 | Sepai et al. . |
| 5,455,933 | 10/1995 | Schieve et al. . |
| 5,471,312 | 11/1995 | Watanabe et al. . |
| 5,475,766 | 12/1995 | Tsuchiya et al. ..................... 382/144 |
| 5,477,138 | 12/1995 | Efjavic et al. . |
| 5,481,712 | 1/1996 | Silver et al. . |
| 5,485,570 | 1/1996 | Bushboom et al. . |
| 5,491,780 | 2/1996 | Fyles et al. . |
| 5,495,424 | 2/1996 | Tokura . |
| 5,495,537 | 2/1996 | Bedrosian et al. . |
| 5,500,906 | 3/1996 | Picare et al. . |
| 5,506,617 | 4/1996 | Parulski et al. . |
| 5,506,682 | 4/1996 | Pryor . |
| 5,511,015 | 4/1996 | Flockencier . |
| 5,519,840 | 5/1996 | Maties et al. . |
| 5,526,050 | 6/1996 | King et al. . |
| 5,528,703 | 6/1996 | Lee . |
| 5,532,739 | 7/1996 | Garakani et al. . |
| 5,539,409 | 7/1996 | Mathews et al. ..................... 342/26 |
| 5,548,326 | 8/1996 | Michael . |
| 5,550,763 | 8/1996 | Michael . |
| 5,553,859 | 9/1996 | Kelly et al. . |
| 5,557,410 | 9/1996 | Huber et al. . |
| 5,557,690 | 9/1996 | O'Gorman et al. . |
| 5,566,877 | 10/1996 | McCormack . |
| 5,568,563 | 10/1996 | Tanaka et al. . |
| 5,574,668 | 11/1996 | Beaty . |
| 5,574,801 | 11/1996 | Collet-Beillon . |
| 5,581,632 | 12/1996 | Koljonen et al. . |
| 5,583,949 | 12/1996 | Smith et al. . |
| 5,583,954 | 12/1996 | Garakani . |
| 5,586,058 | 12/1996 | Aloni et al. . |
| 5,592,562 | 1/1997 | Rooks . |
| 5,594,859 | 1/1997 | Palmer et al. . |
| 5,602,937 | 2/1997 | Bedrosian et al. . |
| 5,608,490 | 3/1997 | Ogawa . |
| 5,608,872 | 3/1997 | Schwartz et al. . |
| 5,640,199 | 6/1997 | Garakani et al. . |

| | | |
|---|---|---|
| 5,640,200 | 6/1997 | Michael . |
| 5,642,158 | 6/1997 | Petry, III et al. . |
| 5,647,009 | 7/1997 | Aoki et al. ............................. 382/100 |
| 5,657,403 | 8/1997 | Wolff et al. . |
| 5,672,334 | 9/1997 | Nichani et al. . |
| 5,676,302 | 10/1997 | Petry, III . |
| 5,696,848 | 12/1997 | Patti et al. . |
| 5,715,369 | 2/1998 | Spoltman et al. . |
| 5,717,785 | 2/1998 | Silver . |
| 5,724,439 | 3/1998 | Mizuoka et al. . |
| 5,742,037 | 4/1998 | Scola et al. . |
| 5,751,853 | 5/1998 | Michael . |
| 5,754,679 | 5/1998 | Koljonen et al. . |
| 5,757,956 | 5/1998 | Koljonen et al. . |
| 5,761,326 | 6/1998 | Brady et al. . |
| 5,768,443 | 6/1998 | Michael e tal. . |
| 5,793,899 | 8/1998 | Wolff et al. . |
| 5,796,386 | 8/1998 | Lioscomb et al. . |
| 5,796,868 | 8/1998 | Dutta-Choudhury . |
| 5,801,966 | 9/1998 | Ohashi . |
| 5,805,722 | 9/1998 | Cullen et al. . |
| 5,809,658 | 9/1998 | Jackson et al. . |
| 5,818,443 | 10/1998 | Schott . |
| 5,825,483 | 10/1998 | Michael et al. . |
| 5,825,913 | 10/1998 | Rostami et al. . |
| 5,835,622 | 11/1998 | Koljonen et al. . |
| 5,845,007 | 12/1998 | Ohashi et al. . |
| 5,848,189 | 12/1998 | Pearson et al. . |
| 5,850,466 | 12/1998 | Schott . |
| 5,859,923 | 1/1999 | Petry, III et al. . |
| 5,861,909 | 1/1999 | Garakani et al. . |
| 5,872,870 | 2/1999 | Michael . |
| 5,878,152 | 3/1999 | Sussman . |
| 5,900,975 | 5/1999 | Sussman . |
| 5,901,241 | 5/1999 | Koljonen et al. . |
| 5,909,504 | 6/1999 | Whitman . |
| 5,912,768 | 6/1999 | Sissom et al. . |
| 5,912,984 | 6/1999 | Michael et al. . |
| 5,918,196 | 6/1999 | Jacobson . |
| 5,933,523 | 8/1999 | Drisko et al. . |
| 5,943,441 | 8/1999 | Michael . |

OTHER PUBLICATIONS

Newletter from Acquity Imaging, Inc., "Remote Vision Support Package—The Phones Are Ringing!," 1 page.

PictureTel Corporation Product Brochure "Picturetel Live PCS 100(tm) Personal Visual Communications System," 3 pp. (1993).

PictureTel Corporation Procuct Brochure "Picturetel System 1000: Completer Videoconferencing for cost Sensitive Applications," 4 pp. (1993).

PictureTel Corporation Product Brochure, "Picturetel System 4000(tm) A Family of Models to Fit Your Application From Offices to Boardrooms, Classrooms, and Auditoriums," 4 pp. (1993).

Symantec Corporation, "The Norton pcAnywhere User's Guide," Table of Contents 8 pp; Introduction of pcAnywhere Technology pp i–vii; Chapter 7—Sessions; pp. 191–240 (1991).

Bursky,Dave, "CMOS Four–Chip Set Process Images at 20–MHz Data Rates," Electronic Design May 28, 1987, pp. 39–44.

Plessey Semiconductors, Preliminary Information, May 1986, Publication No. PS2067, May 1986, pp. 1–5.

NEC Electronics Inc., PD7281 Image Pipelined Processor, Product Information Brochure, pp. 2–169–2–211.

Horn, Berthold Klaus Paul. "Robot Vision", The Massachusetts Institute for Technology, 1986.

Racca Roberto G., Stephenson Owen, and Clements Reginald, M. High–speed video analysis system using multiple shuttered charge–coupled device imagers and digital storage. Optical Engineering (Jun. 1992) 31:6.

Gevorkian David Z., Astola Jaakko T., and Atourian Samvel M. "Improving gil–Werman Algorithm for Running lMin and Max Filters" IEEE Transactions on Pattern Analysis and Machie Intelligence, vol. 19, No. 5, May 1997, pp. 526–529.

Gil, Joseph and Werman Michael. "Computing 2–D Min, Median, and Max Filters" IEEE transactions on Pattern Analysis and Machine Intelligence, vol. 15, No. 5, may 1993, pp. 504–507.

Chapetr 3: "Guidelines for Developing MMX Code," Intel.

Chapter 4: "MMX Code Development Strategy," Intel.

Chapter 5: "MMX Coding Techniques," Intel.

Chapter 3: "Optimization Techniques for Integer Blended Code," Intel.

Rosenfeld, Azriel. "Computer Vision: Basic Principles," Proceedings of the IEEE. vol. 76, No. 8, Aug. 1988, pp. 863–868.

MACHINE VISION METHODS FOR IDENTIFYING COLLINEAR SETS OF POINTS FROM AN IMAGE

BACKGROUND OF THE INVENTION

The invention pertains to machine vision and, more particularly, to methods for identifying sets of collinear points from an image.

Machine vision refers to the automated analysis of an image to determine characteristics of objects and other features shown therein. It is often employed in automated manufacturing lines, where images of components are analyzed to determine placement and alignment prior to assembly. Machine vision is also used for quality assurance. For example, in the pharmaceutical and food packing industries, images of packages are analyzed to insure that product labels, lot numbers, "freshness" dates, and the like, are properly positioned and legible.

In many machine vision applications, it is essential to identify sets of points that define lines and, more particularly, parallel or perpendicular lines. This is typically critical in determining the position and orientation of an imaged object. In electronic circuit board assembly, for example, integrated circuit chips and sockets must be precisely positioned before they can be soldered into place. Metallic solder pads feature predominantly in images of these components and, as such, are often used in determining chip location and orientation.

Objects whose image is to be analyzed by machine vision typically include calibration targets. Often a cross-shaped symbol or parallel array of dots, such a target facilitates determining the position and orientation of the object in the image. A calibration target can also be used to correlate the image reference frame with that of the motion stage or conveyor belt on which the imaged object is placed.

Regardless of whether they are formed by solder pads, calibration targets, or otherwise, there are several known approaches to the problem of finding parallel and perpendicular lines from an image. One of the best known techniques is the Hough transform. According to that technique, every point in the set "votes" into an accumulator array in parameter space. Parameter pairs with the sufficiently many votes are identified as lines. Though oft used, the Hough transform can require significant computation resources and time to carry out these tasks.

For small data sets, the art also suggests exhaustively partitioning the set of points into all possible combinations of candidate lines, and evaluating the "goodness" of each one, e.g., with a least squares test. This procedure is impractical for large data sets because the computational complexity grows rapidly with the number of points.

An object of this invention is to provide an improved machine vision methods and, particularly, improved methods for identifying sets of collinear points from an image.

A related object is to provide methods for identifying parallel and perpendicular lines from an image.

A further object is to provide such methods as can be readily implemented on conventional digital data processors or other conventional machine vision analysis equipment.

Yet still another object of the invention is to provide such methods that can rapidly analyze images without undue consumption of resources.

SUMMARY OF THE INVENTION

The foregoing objects are among those attained by the invention, which provides a two-phase method for identifying sets of collinear points in data points, e.g., extracted from an image. During a first, "angle-finding" phase, the angular orientation of the predominant line defined by the sets of points is estimated. During a second, "line-finding" phase, sets of collinear points aligned at that angle (or at angles offset, e.g., by 90° therefrom) are identified.

More particularly, one aspect of the invention provides a machine vision method for identifying one or more sets of collinear points in data points, e.g., extracted from an image. The method includes finding an estimated angle of the sets by taking projections of the data points at multiple angles, e.g., at 10° increments between 0° and 170°, and estimating the angle of the predominant sets from the projection(s) with the best-formed, or highest density, peak(s).

The method further includes identifying the sets of collinear points by taking a projection of the data points at the estimated angle and determining the locations of the sets from the locations of the peaks in that projection. Once those sets have been identified, characteristics of the lines they define can be output, e.g., for use by other machine vision tools or apparatus. Those characteristics can include, for example, the numbers of lines, the angles and locations of the lines, the points that make up the lines, etc.

In a related aspect, the invention provides a method as described above in which the estimated angle determined in the angle-finding phase is a function of the two (or more) candidate angles that resulted in projections with the highest density peaks. Thus, for example, where projections at 40° and 50° produce the highest density peaks, the estimated angle is interpolated between those angles, e.g., in accord with the relative density or height of those peaks.

In another related aspect of the invention, a method as described above utilizes a filter to determine the density of the peaks in the projections and, more particularly, to determine which of the projections has the highest density peaks. The filter can be, for example, a "boxcar" filter sized in accord with the estimated width of the peaks that the sets of collinear points are expected to produce in the projections.

Further aspects of the invention provide for operator determination of the candidate angles utilized in determining the estimated angle. Alternatively, those angles can be determined in accord with the expected length and spacing of the lines formed by the sets of collinear points.

According to another aspect of the invention, the estimated angle can be determined in successive approximations. A first determination of the estimated angle can be made by taking projections of the data points at a first set of candidate angles covering a first angular range at a first angular resolution. Second and successive determinations can be made over narrower angular ranges covering successively smaller ranges, e.g., bracketing the estimate from each prior pass, with finer angular resolutions. For example, taking projections at 10° increments between 0° and 170° can provide a first determination of the estimated angle. Based on that determination, a second determination can be made by taking projections at 1° increments between 45° and 55°, and so forth.

As in the angle-finding phase, a further aspect of the invention provides that the line-finding phase can use a filter, such as a boxcar filter, to find the highest density peaks in the projection taken at the estimated angle. That filter, too, can be sized according to the estimated width of the peaks that the sets of collinear points are expected to produce in the projection.

These and other aspects of the invention are evident in the drawings and in the detailed description that follows.

BRIEF DESCRIPTION OF THE DRAWINGS

A better understanding of the invention may be attained by reference to the drawings in which.

DETAILED DESCRIPTION OF THE ILLUSTRATED EMBODIMENT

Figure 1:
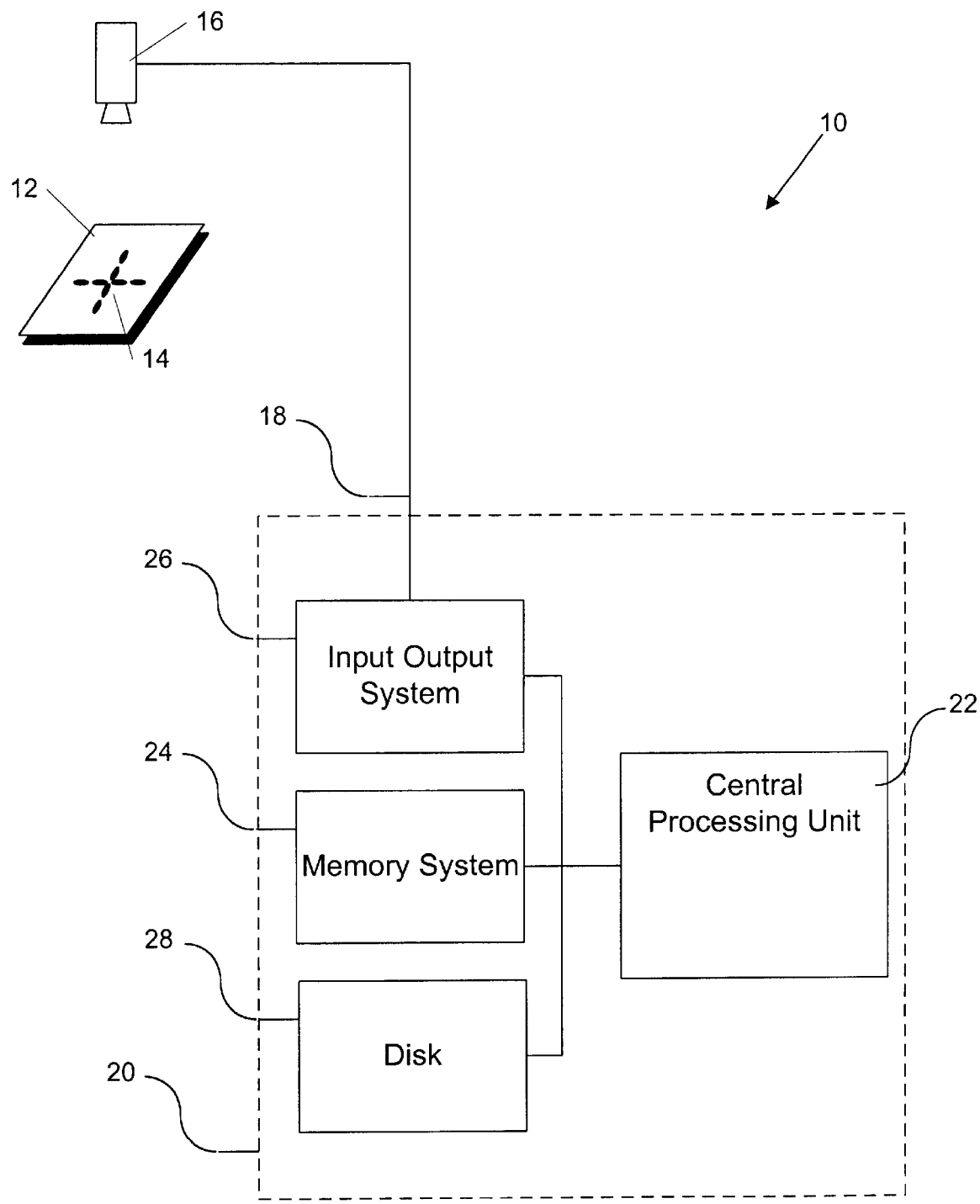
FIG. 1 depicts a machine vision system for practice of the invention.

FIG. 1 illustrates a machine system 10 of the type in which the invention is practiced. The system 10 includes a capturing device 16, such as a conventional video camera or scanner, that generates an image of an object 12 that bears one or more sets of collinear points—in this case, two sets of collinear points 14 arranged perpendicularly to one another. Image data (or pixels) generated by the capturing device 16 represent, in the conventional manner, the image intensity (e.g., color or brightness) of each point in the scene at the resolution of the capturing device 16.

The digital image data is transmitted from capturing device 16 via a communications path 18 to an image analysis system 20. This can be a conventional digital data processor, or a vision processing system of the type commercially available, for example, from the assignee hereof, Cognex Corporation, programmed in accord with the teachings hereof to identify sets of collinear points from the image data.

The image analysis system 20 may have one or more central processing units 22, main memory 24, input-output system 26, and disc drive (or other mass storage device) 28, all of the conventional type.

The system 20 and, more particularly, central processing unit 22, is configured by programming instructions according to the teachings hereof for identifying sets of collinear points, as described in further detail below. Those skilled in the art will appreciate that, in addition to implementation on a programmable digital data processor, the methods and apparatus taught herein can be implemented in special purpose hardware.

Figure 2:
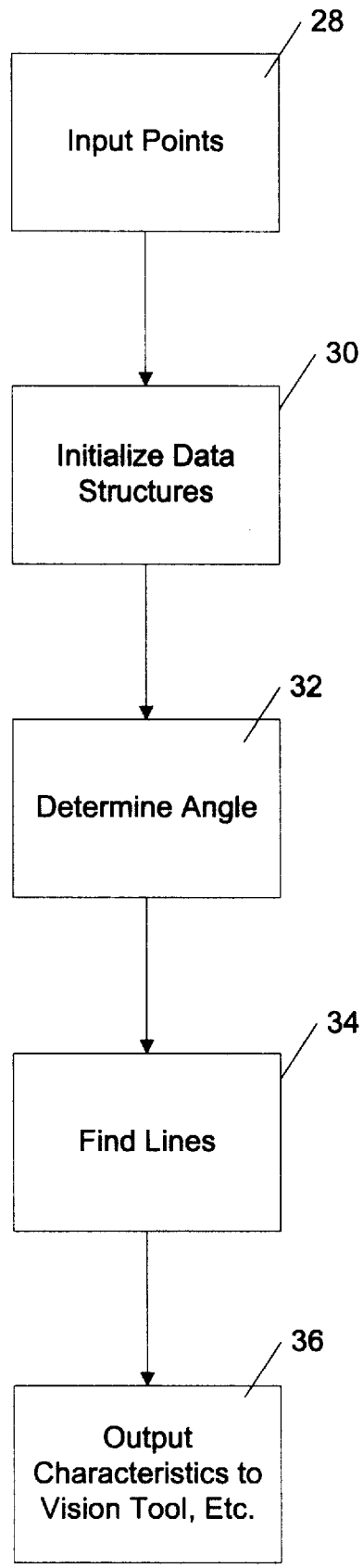
FIG. 2 is a flow chart summarizing operation of a method according to the invention for identifying sets of collinear points in data points, e.g., extracted from an image.

FIG. 2 is a flow chart summarizing operation of a method according to the invention for identifying sets of collinear points from an image. In step 28, the method inputs data points to be analyzed. These may be extracted from an image (e.g., by a vision processing tool, such as by connectivity analysis, normalized correlation, etc.), or they may be artificially derived, supplied by the operator, or otherwise obtained. The data points contain sets of collinear points, as well as non-collinear points and noise. The sets of collinear points may define a single line or sets of parallel and/or perpendicular lines. The sets may also define sets of lines at angles other than 0° (parallel) and 90° (perpendicular).

In step 30, data structures used in the angle-finding and line-finding phases of the method are allocated and initialized. This results in creation of pointers that are passed to functions used in these phases. For example, pointers to the image data points may be cached in the private data structure, so that those points themselves are not be destroyed until the private structure itself is destroyed.

As those skilled in the art will appreciate on reading the description below, different data points may be specified for use in the angle-finding and line-finding phases. For example, points taken from blob centroids that are close to image edges may give skewed results in the angle-finding phase, even though those points may be used in the line-finding phase.

The projection bins used in the angle-finding and line-finding phases are preferably allocated and initialized during the initialization phase. Adequate numbers of bins are allocated for the widest range of points possible, and for the smallest bin size possible.

Figure 3:
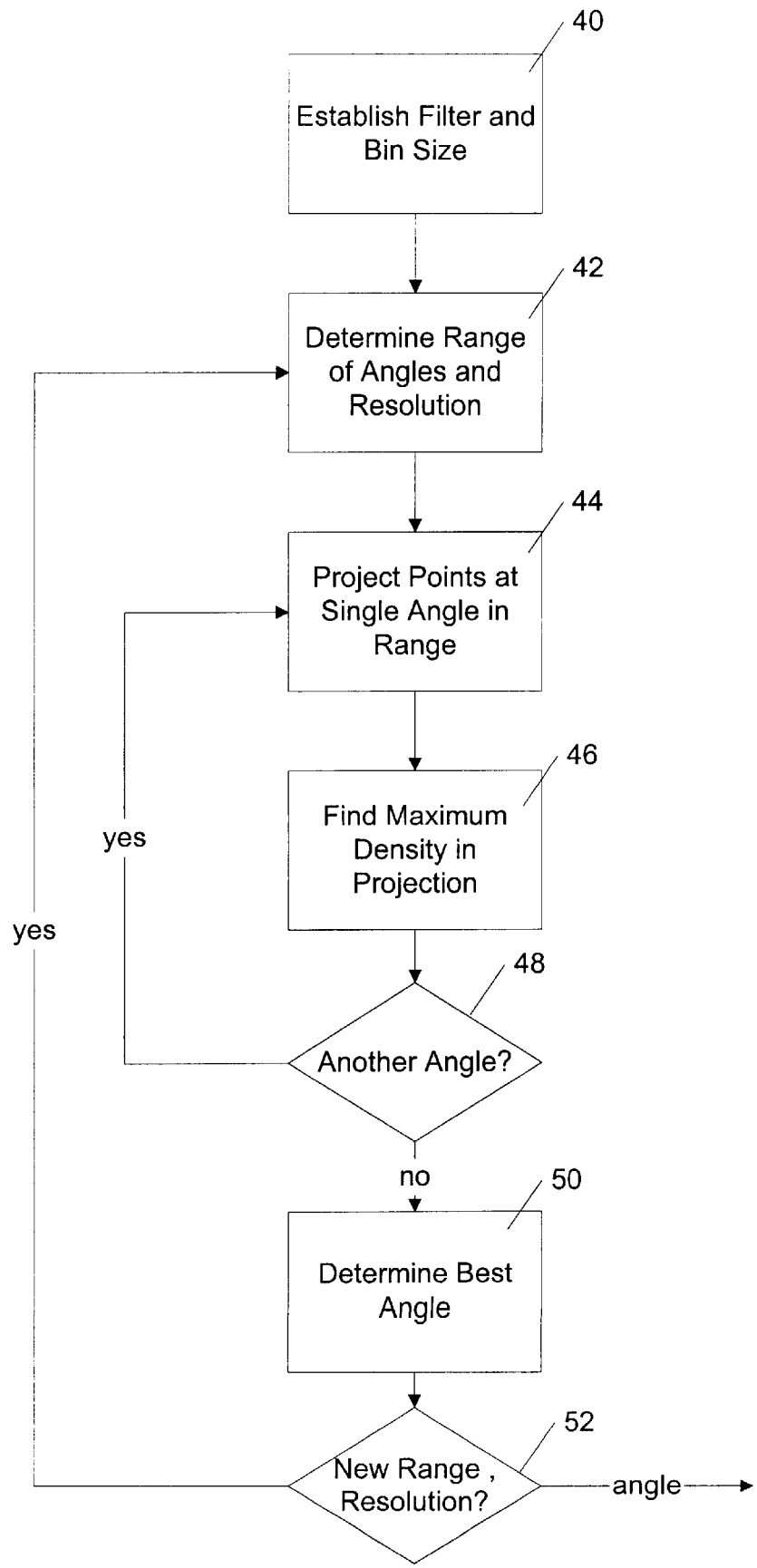
FIG. 3 is a flow chart detailing operation of an angle-finding phase of a method according to the invention.

In step 32, the method performs an angle-finding step to estimate the angular orientation of predominant line defined by sets of collinear points in the image. Details of this step are shown in FIG. 3 and described below.

In the case of an image with a single set of collinear points, the estimated angle is the angle of the line defined by those points. In the case of an image with multiple sets of parallel collinear points, the estimated angle is the angle of the predominant line defined by those sets. In the case of an image with one or more perpendicular sets of collinear points, the estimated angle is the angle of the predominant line defining one axis of the sets, e.g., the predominant angle of the "horizontal" lines or of the "vertical" lines.

Figure 4:
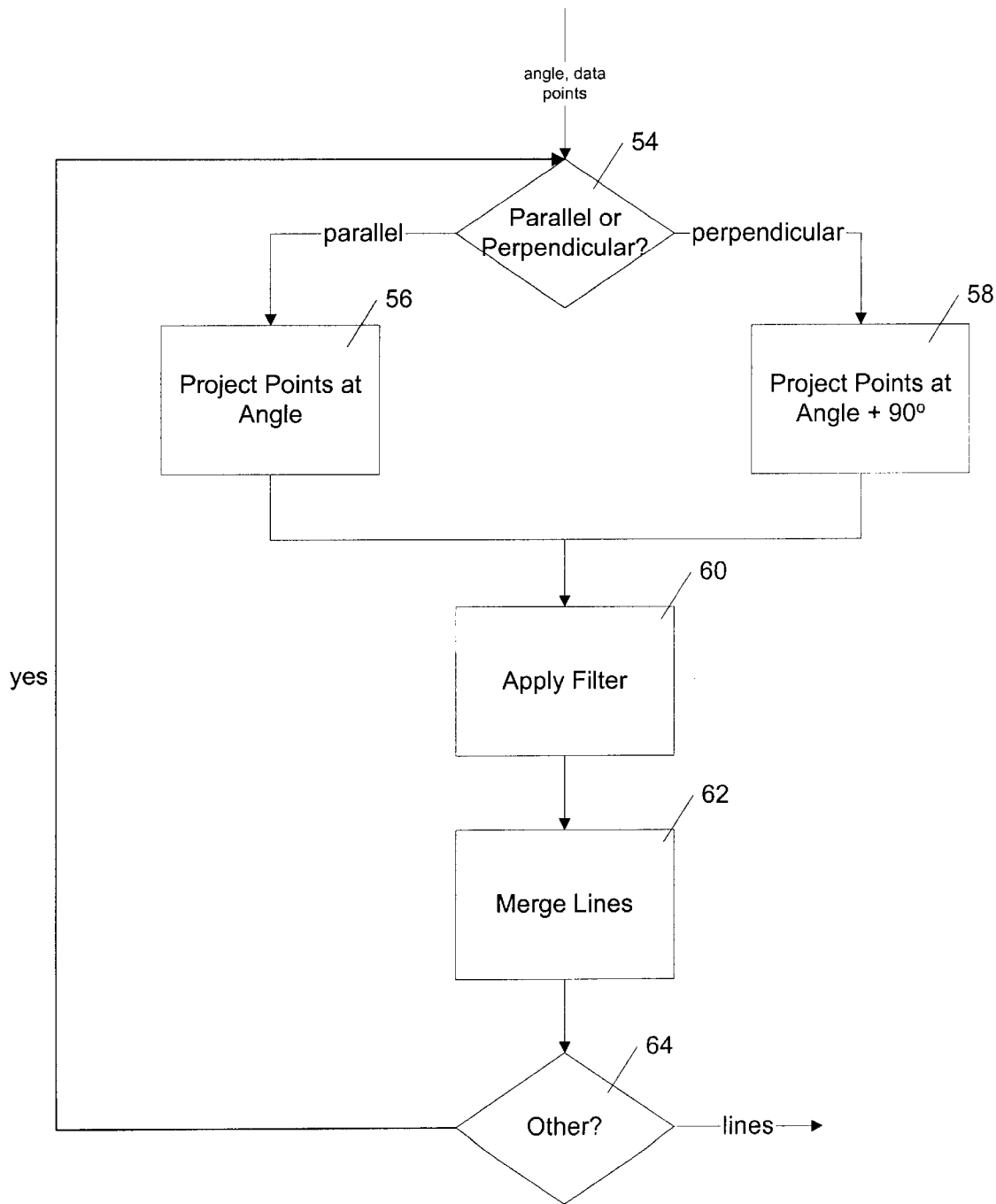
FIG. 4 is a flow chart detailing operation of an line-finding phase of a method according to the invention.

In step 34, the method performs a line-finding step to identify sets of collinear points in the data points aligned with the estimated angle. Details of this step are shown in FIG. 4 and described below.

In step 36, the method outputs a characteristic of the sets identified in step 34. This can be to another machine vision tool or to a human operator. Those characteristics include the numbers of lines (or, more properly, line segments), the angles of the lines, the coordinates of the data points defining those lines, the locations of those lines, e.g., distance and direction from the image origin, etc.

Although the discussion herein is principally directed to finding parallel or perpendicular lines, those skilled in the art will appreciate that the teachings herein can be applied in finding collinear sets of points, regardless of their angular orientation to one another. Thus, by way of non-limiting example, it will be appreciated that the invention can be applied to finding points defining edges of similarly triangular or octagonal objects from an image.

Furthermore, although the discussion herein is directed to finding sets of collinear points from an image, it will appreciated that the teachings are equally applicable to finding those sets in portions of an image, or windowed image.

FIG. 3 is a flow chart depicting the methodology of a preferred angle-finding phase in a system according to the invention. In this phase, the method finds the angle of the predominant or strongest line in a set of data points. To do so, the entire set of points is projected at multiple angles. At each projection angle, a count of how many points project at a particular distance is accumulated in an array of projection bins. This one-dimensional accumulator space is then filtered to find the maximum density of projected points. The projection angle that produces a peak with the highest density is the best projection angle: the strongest line is aligned with that angle.

In step 40, the method establishes a bin size and filter size for projections taken during the angle-finding phase. In a preferred embodiment, this information is provided by the operator, e.g., via a keyboard. Alternatively, it can be pre-stored in data or in any other known manner.

Both the angle-finding phase and the line-finding phase (discussed below) operate by projecting the data points into bins, then filtering the bins with an unweighted filter to find the maximum density of projected points. It is assumed that the maximum density of projected points under the filter is caused by sets of collinear points, or lines. Therefore, a filter is chosen that is neither too large (so points from other lines or noise points are not included under the filter) nor too small (so all points from a complete line are included under the filter).

The number of bins under the filter is selected so the filter only covers a few bins. More bins under the filter will slow performance without adding extra accuracy to the answer. Ideally, the peaks resulting of projections of each set of collinear points in the data points should fall in a handful, say, three to five, bins. This avoids having to use very large filters.

The filter size is preferably large enough to capture any peaks resulting from projection of a line in the data points. For example, if the angle-finding phase takes projections every x degrees, the worst difference between the true angle of the sets of collinear points and the closest sample projection is x/2. The filter size is, accordingly, set to (line length) * sin(x/2). In this regard, the line length is assumed to be the shortest expected length of a complete line in the image. If the number chosen for this length is too small, chance alignments of points might be mistaken as a line. If it is too large, lines with only a few points might be missed.

In step 42, the method determines an angular range and resolution for projections taken of the data points in order to determine the estimated angle. In one embodiment, this information is input by the operator, e.g., via a keyboard. Alternatively, it can be pre-stored in data or source code, or in any other known manner.

In order to search the entire coordinate space, the range can be selected to be 0° to 170°, and the angle increment can be selected to be 10°. The angular resolution or increment is be chosen small enough so that the "real" maximum density in the projection is greater than the expected "chance" maximum density resulting from the projection of overlapping sets of collinear points.

Generally speaking, it is more efficient to run the angle finding phase at several search resolutions, iteratively narrowing the range to the correct angle. For example, if searching all possible angles to an accuracy of 0.25°, one could search between 0° and 170° at 0.5° angle increments, causing 340 projections of the input points. It is more efficient, however, to make three searches. An initial search is made between 0° and 170°, at 10° increments, to find the angle to the closest 5 degrees. A second search is then made in a +/−10° range bracketing the found angle at 3° increments. A third search is made in a +/−1.5° range bracketing the second found angle at 0.5° increments. By taking three passes, each input point is projected only 32 times.

In order to determine the minimum number of samples that must be evaluated to get 0.5° accuracy, the following analysis may be used.

To begin, S is defined as the number of sample projections used for a given angular range. For example, at an increment of 10 degrees, S=5 samples are needed to cover the search range from 10 degrees to 50 degrees. It will be noted that, although there are five samples, the range is divided into only four 10° subranges.

L is defined as the number of search levels, i.e., the number of different angular ranges that will be used. R is defined as the number of retained increments, i.e., the number of subranges that are re-searched at each successive search level. In a preferred embodiment, R is three. F is defined as the fraction of the search range that will be re-searched at the next successive search level. In a preferred embodiment, where R is three, f=3/(S−1). More generally, f=R/(S−1).

In order to reduce the initial search range by a factor of 100 from, say, 50 degrees to 0.5 degrees), $f^L$=1/100, or $(R/(S-1))^L$=1/100. In order to reduce the search range using the fewest total sample projections, the total number of sample projections, S*L, must be minimized. These conditions are solved in the following tables, which show obvious minima for S*L

| Using 3.0 retained increments Evaluation table for final ratio = 100 | | |
| --- | --- | --- |
| Number of Samples | Levels Needed | Total Evaluations |
| 5 | 16.0078 | 80.04 |
| 6 | 9.0152 | 54.09 |
| 7 | 6.6439 | 46.51 |
| 8 | 5.4351 | 43.48 |
| 9 | 4.6952 | 42.26 |
| 10 | 4.1918 | 41.92 |
| 11 | 3.8250 | 42.07 |
| 12 | 3.5444 | 42.53 |
| 13 | 3.3219 | 43.19 |
| 14 | 3.1406 | 43.97 |
| 15 | 2.9895 | 44.84 |

In step 44, the method takes a projection of the data points at the first of the candidate angles in the angular range established in step 42. The projection, which is a well known function in the machine vision arts, can be performed using any conventional projection vision tool. One technique for taking a projection is described in Horn, *Robot Vision* (M.I.T. 1986), Chapter 3, Section 3.3, pages 53–57, the teachings of which are incorporated herein by reference.

In yet another preferred embodiment, the projection of a point (x, y) into a bin at angle "theta" is determined in accord with the relation:

$$bin\# = (x*\cos + y*\sin)/bs,$$

where
  bs=bin_size,
  sin=sin(theta) and
  cos=cos(theta).
This expression can be rearranged as follows:

$$bin\# = x*(\cos/bs) + y*(\sin/bs);$$

$$= (x/k)*(\cos*k/bs) + (y/k)*(\sin*k/bs);$$

$$= \{(x/k)*[(2^\wedge 32)*\cos*k/bs] + (y/k)*[(2^\wedge 32)*\sin*k/bs]\}*(2^\wedge -32);$$

This latter expression is advantageous in that the quantities in square brackets need to be computed only once for a given projection angle. (x/k) and (y/k) can be computed once per field of view (FOV). A more important reason is that, given an appropriate choice of 'k', the following four quantities can always be expressed as 32-bit integers with no overflow and little or no loss of precision:

$(x/k), (y/k), [(2^{\wedge}32)*\cos*k/bs], [(2^{\wedge}32)*\sin*k/bs]$

This makes the math easy to do using only two integer multiplies and a couple of integer additions.

To pick an appropriate value for k, one must consider what values make sense for the quantities (x/k) and (y/k), as well as the quantities $[(2^{\wedge}32)*\cos*k/bs]$ and $[(2^{\wedge}32)*\sin*k/bs]$. In a preferred embodiment for use in machine vision inspection of surface mounted devices, k is chosen as one-fiftieth of a pixel.

Figure 5A:
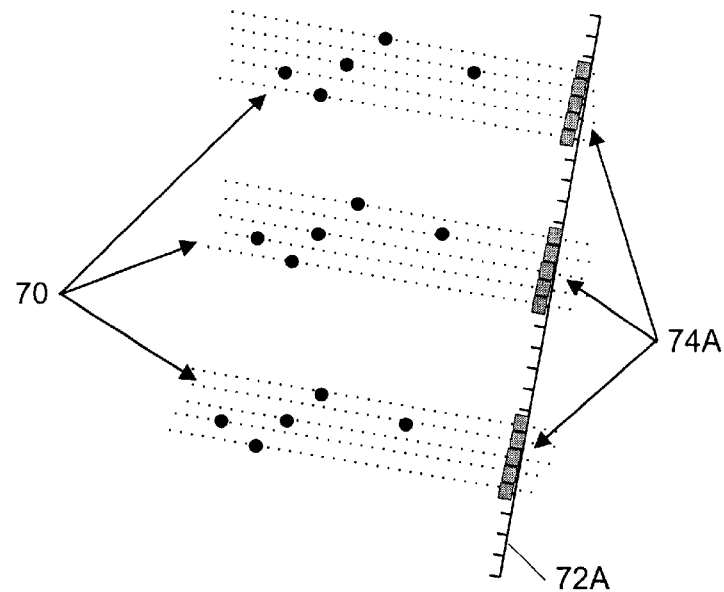
FIGS. 5A–5B depict projections of collinear point sets at different candidate angles during an angle-finding phase of a method according to the invention.
Figure 5B:
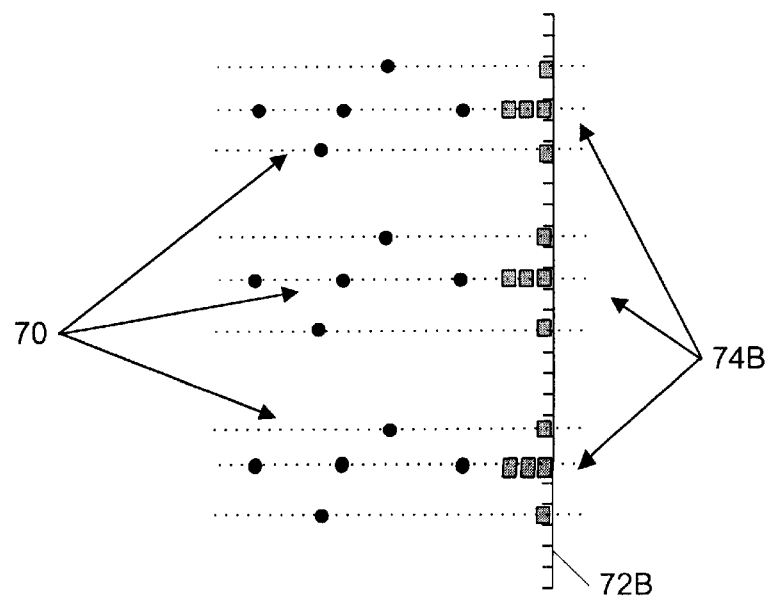
Figure 6A:
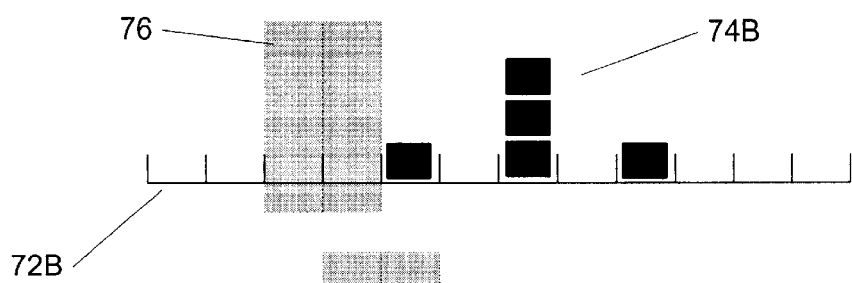
FIGS. 6A–6G depict the boxcar filtering of a projection array during an angle-finding phase of a method according to the invention.
Figure 6B:
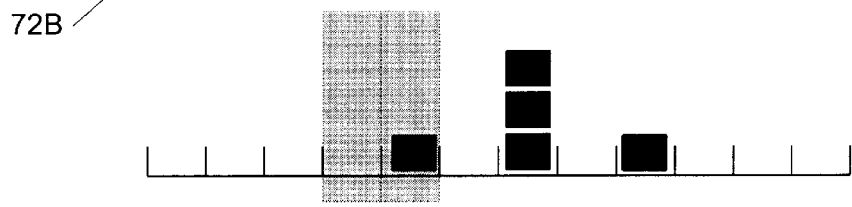
Figure 6C:
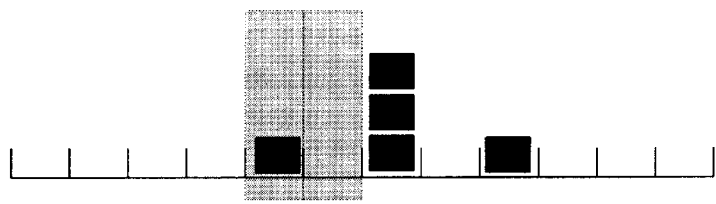
Figure 6D:
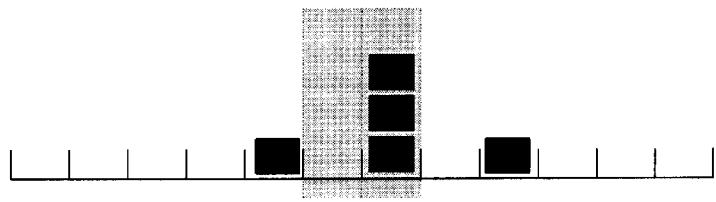
Figure 6E:
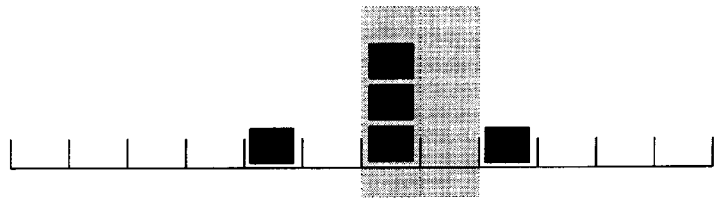
Figure 6F:
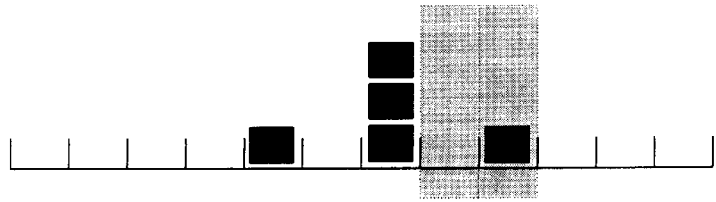
Figure 6G:
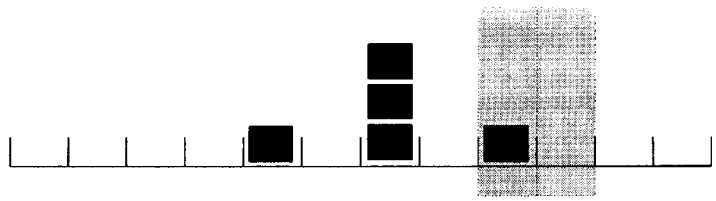

FIGS. 5A–5B illustrate projections taken at two candidate angle (80°, 90°) of three sets of collinear points 70, each comprising five points. At each angle, the points 70 project into different combinations of bins of projection arrays 72A, 72B. Those different combinations result in peaks of different densities.

Thus, as shown in FIG. 5A, the five points in each of the three sets 70 project into respective groups of bins in array 72A. This is represented by the three groups 74A of projected-points, which are represented in the drawing by groups squares, each of which designates the projection of a single respective point 70 into the array 72A. Each of the groups, which is referred to herein as a peak, has a maximum density of two, as described below. Those skilled in the art will appreciate that these "peaks" represent portions of the array 72A which exhibit higher density of projected-points relative to the ambient level thereof (e.g., resulting from noise and non-collinear sets of points). For example, groups 74A and 74B represents peaks, as that term is used herein, insofar as they exhibit higher density of projected-points relative to the ambient level.

Points 70 project into different peaks when projected at different angles. Thus, as shown in FIG. 5B, the points project into peaks 74B of density three when projected at 90°.

Referring to FIG. 3, in step 46, the method determines the density of the peak resulting from the projection of step 44. As evident in the discussion above, the density of peaks will be the highest for in those projections that are taken at angles most closely aligned with the angle of the predominant set of collinear points in the image.

Referring to FIGS. 5A–5B, the density of the peaks 74A–74B is determined by passing a filter over projection arrays 72A–72B. This is illustrated in FIGS. 6A–6G, which show movement of a boxcar filter 76 over one of the peaks 74B in projection array 72B.

As the filter 76 moves, the method counts how many projected-points (i.e., squares) it covers. For example, in FIG. 6A, the filter 76 is not over the peak 74B; hence, it appears to have a count and density of zero. As the filter 76 is moved, however, it becomes apparent that the peak has a definite density. Particularly, in FIG. 6D, the filter 76 is centered over the peak 74B, revealing its true count and density of three.

Those skilled in the art will appreciate that techniques other than those shown in FIGS. 6A–6G and discussed above can be used to determine which of the projections is best aligned with the sets of collinear points 70 of FIGS. 5A–5B. For example, filters other than boxcar filters can be passed over the projection arrays 72A–72B. In other embodiments of the invention, filters are not used in determining the quality of the peaks. Instead, only the heights of the peaks are tracked.

Referring back to step 46, of FIG. 3, the method stores an indication of the maximum density of the projection taken in step 44. That information is later used in determining which of the projections was taken along an angle best aligned with the sets of collinear points in the image.

In step 48, the method determines whether further candidate angles are required to cover the angular range established in step 42. If so, the method loops back to step 44. From there, steps 44 and 46 are repeated using the next angle at the designated angular resolution. If no further candidate angles are required, the method proceeds to step 50.

In step 50, the method determines which of the projections was taken at an angle best aligned with the sets of collinear points in the image. This is accomplished by comparing the peak densities determined in step 46 for each of the projections. In one embodiment of the invention, the estimated angle of the collinear points is assumed to be equal to the candidate angle of the single projection with the highest density peak. In a preferred embodiment, the estimated angle is interpolated from the candidate angles associated with the two highest density peaks, as follows:

$$\Theta_{MAX} - \frac{1}{2}\Theta_{INCR} * \frac{1}{4\left(\frac{dMAX}{dOTHER} - 1\right)}$$

where, $\Theta_{MAX}$ is candidate angle associated with the highest density peak;

$\Theta_{INCR}$ is the angular difference between the candidate angles associated with the two highest density peaks;

dMAX is the density of the highest density peak; and dOTHER is the density of the second highest density peak;

In step 52, the method determines whether any further passes of the angle finding technique will be made to improve the resolution of the estimated angle. If so, the method loops back to step 42, where an angular range and resolution are set as described above to bracket the previously determined estimated angle. If not further passes are required, the method utilizes the estimated angle in the line finding phase.

FIG. 4 is a flow chart depicting the methodology of a preferred line-finding phase in a system according to the invention. In this phase, the method identifies the sets of collinear points in the data points aligned with the estimated angle (i.e., the angle of the sets of predominant collinear points, as determined in the angle-finding phase), as well as lines at 90° to the estimated angle.

It does this by projecting the points at two angles: the input angle and the input angle plus 90 degrees. Lines are located at peaks in the projection. However, this phase is interested in finding all lines at the angle, not just the strongest line. It also gathers additional information about lines: the identities (e.g., coordinates) of the points that make them up, the number of points that make them up, and/or their distances along the line.

In step 54, the method determines whether to identify sets of collinear points aligned with the estimated angle or whether to identify those at 90° to that angle. This determination can be made based on user input, preprogrammed instructions, etc. In a preferred embodiment, the method finds both types of lines: first it finds those aligned with the estimated angle, then it finds those at 90° to that angle.

Figure 7A:
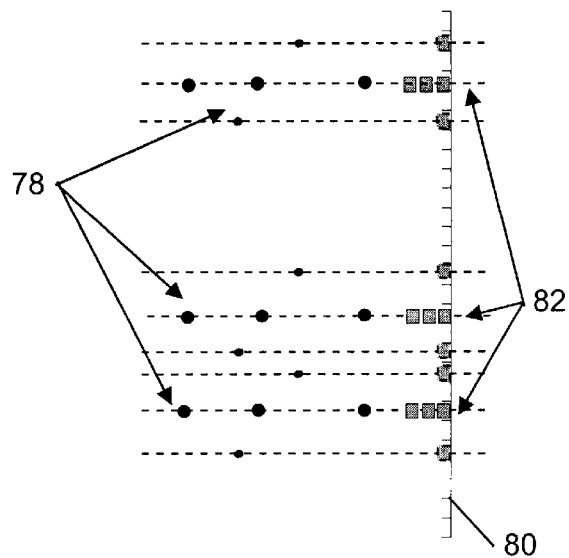
FIGS. 7A–7C depict identification of lines corresponding to collinear sets of points during a line-finding phase of a method according to the invention.

Depending on the flow effected by step 54, in step 56 the method takes a projection of the data points at the estimated angle, while in step 58 the method takes a projection at the estimated angle plus 90°. This projection, which is conducted as described above, is illustrated in FIG. 7A. There, the sets of collinear points 78 are projected at the estimated angle (90°) into projection array 80. Peaks 82 arising from the projection are shown as groupings of squares in that array 80.

Figure 7B:
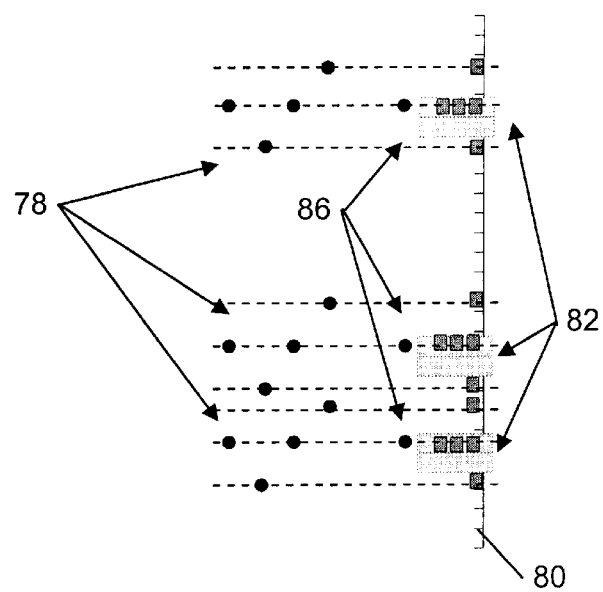

Regardless of the angle at which the projection is taken, in step 60 of FIG. 4 the method applies a filter to identify all peaks in the projection and, thereby, to identify all sets of points aligned with the angle of the projection. The filter applied in this step can be identical to that discussed above in connection with the angle-finding phase; however, it need not be. This is illustrated in FIG. 7B, where boxcar filters 86 of the type described above are shown centered above the peaks 82. Though illustrated otherwise for the sake of convenience, in a preferred embodiment, a single boxcar filter 86 is passed over the entire projection array 80.

To avoid "false positives," the filtering step 60 of FIG. 4 preferably imposes a minimum threshold on the density and/or height required for peak to be considered as being associated with a line. Thus, for example, if a peak has a density of four or less (i.e., indicating that there are four or less points in the corresponding set that are aligned with the projection angle), it may be ignored for purposes of the line-finding phase. Likewise, a peak may be ignored if its height falls below a minimum threshold.

The filtering step 60 preferably stores identifying information for the sets of collinear points that contributed to the peaks that exceed the aforementioned thresholds. In a preferred embodiment, this is effected by storing the coordinates of each set of data points that contributed to those peaks.

In step 62, the method merges sets of collinear points that are sufficiently close to constitute a single line. This can be accomplished as a final phase of the filtering step, i.e., by comparing the distances between the peaks identified by the filter. It is preferably accomplished by comparing the distances between the points that make up the respective sets of collinear points. It can, alternatively, be accomplished by identifying the lines defined by those points and, in turn, comparing the distances between the lines.

Figure 7C:
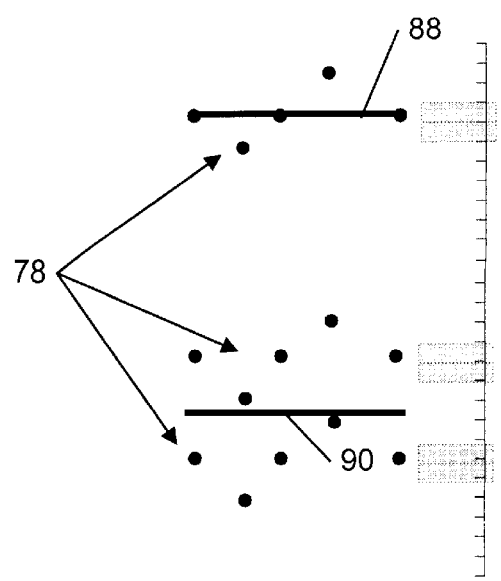

The effect of merging step 62 is shown in FIG. 7C. There a single set of the collinear points 78 is identified with line segment 88, while two closely-spaced sets are associated with line segment 90.

In step 64, the method determines whether further sets of collinear points are to be identified in the data points. Thus, for example, if a first pass of the line-finding phase was dedicated to finding sets of collinear points aligned with the estimated angle, step 64 can route flow back to step 54 to find sets aligned with the estimated angle plus 90°.

At the conclusion of the line-finding phase, the method returns, e.g., to the operator or to another machine vision tool, the identity of the line segments 88 and 90 identified during that phase. This can include the slopes of the line segments, the coordinates of the points that make them up, the length of the lines segments, etc.

Described herein is a method for identifying sets of collinear points from an image meeting the objects set forth above. It will be appreciated that the embodiments shown in the drawings and described above are merely illustrative and that other embodiments incorporating modifications thereto fall within the scope of the invention. Thus, for example, it will be appreciated that the invention can be used to find not only parallel and perpendicular collinear point sets, but also collinear points sets at other angles. In this regard, for example, step 58 of FIG. 4 can be utilized to take projections at the estimated angle plus 45°, 90°, 135°, or any other angle.

In view of the foregoing, what we claim is:

1. A machine vision method for identifying one or more sets of collinear points from data points, the method comprising the steps of:

A. searching among projections taken at a plurality of candidate angles determine an estimated angle of the sets of collinear points;

B. identifying the sets of collinear points from a projection of the data points at an angle based on the estimated angle; and C. outputting a characteristic of a line formed by at least one of the sets of collinear points.

2. A method according to claim 1, wherein step (A) includes taking a projection of the data points at each of the candidate angles, and identifying one or more of the projections that produce highest density peaks.

3. A method according to claim 2, wherein step (A) includes the step of determining the estimated angle of the sets of collinear points from the candidate angles of plural projections that produce the highest density peaks.

4. A method according to claim 3, wherein step (A) includes the step of determining the estimated angle of the sets of collinear points by interpolating between the candidate angles of two projections that produce the two highest density peaks.

5. A method according to claim 2, wherein step (A) includes the step of filtering the projections to find those that produce the highest density peaks.

6. A method according to claim 5, wherein step (A) includes the step of using a filter sized in accord with an estimated width of a peak produced by a projection of the sets of collinear points at the candidate angle.

7. A method according to claim 1, wherein step (A) includes the step of defining the candidate angles in accord with any of (i) operator input, and (ii) an expected length and spacing of lines defined by the collinear sets of points.

8. A method according to claim 1, wherein step (A) includes the steps of making a first determination of the estimated angle of the sets of collinear points by taking projections of the data points at a first set of candidate angles, that first set of candidate angles covering a first angular range at a first angular resolution, and making successive determinations of the estimated angle of the sets of collinear points by taking projections of the data points at successive sets of candidate angles, each successive set of candidate angles covering a successively narrow angular range and being at a successively finer angular resolution than a prior set of candidate angles.

9. A method according to claim 1, wherein step (B) includes the steps of taking a projection of the data points at the estimated angle and finding one or more peaks in that projection corresponding to respective sets of collinear points.

10. A method according to claim 9, wherein step (B) includes the step of filtering the projection to find those peaks.

11. A method according to claim 10, wherein step (B) includes the step of using a filter sized in accord with an estimated width of a peak resulting from taking a projection of the set of collinear points at the estimated angle.

12. A method according to claim 9, wherein step (B) includes the step of merging into one set of collinear points two or more sets of collinear points that correspond to adjacent peaks in the projection.

13. A method according to claim 1, wherein step (C) includes the step of outputting, as the characteristic of a line formed by a set of collinear points, any of an angle of that line, a position of that line, and identities or locations of points making up that line.

14. A machine vision method for identifying one or more sets of collinear points from data points, the method comprising the steps of:

A. determining an estimated angle of the sets of collinear points by taking projections of the data points at a plurality of candidate angles, and by searching among the projection to find one or more projections that produce highest density peaks, B. identifying one or more sets of collinear points by taking a projection of the data points at an angle based on the estimated angle, and finding one or more peaks in that projection corresponding to respective sets of collinear points, and C. outputting a characteristic of a line formed by at least one of the sets of collinear points.

15. A machine vision method for identifying a set of collinear points from an data points, the method comprising the steps of:

A. making a first determination of an estimated angle of the sets of collinear points by taking projections of the data points at a first set of candidate angles covering a first angular range at a first angular resolution, and finding one or more projections producing highest density peaks, B. making one or more successive determinations of the estimated angle by taking successive projections of the data points at successive sets of candidate angles, and finding one or more projections producing highest density peaks for each such set, each set of candidate angles covering a successively narrow angular range and being at a successively finer angular resolution than a prior set of candidate angles, C. identifying one or more sets of collinear points by taking a projection of the data points at an angle based on the estimated angle, and finding one or more peaks in the projection corresponding to respective sets of collinear points, and D. outputting a characteristic of a line formed by at least one of the sets of collinear points.

16. A method according to claim 15, wherein any of steps (A)–(C) include the step of filtering the projection to find one or more peaks therein.

17. A method according to claim 16, wherein including the step of using a filter sized in accord with an estimated width of a peak resulting from taking a projection of the corresponding set of collinear points.

* * * * *

UNITED STATES PATENT AND TRADEMARK OFFICE
CERTIFICATE OF CORRECTION

PATENT NO : 6,075,881
DATED : June 13, 2000
INVENTOR(S): Foster, et al

It is certified that error appears in the above-identified patent and that said Letters Patent are hereby corrected as shown below:

Column 10, line 6: after "candidate angles" please insert --to--.

Column 11, line 12: please delete "projection" and insert therefore --projections--.

Signed and Sealed this

First Day of May, 2001

NICHOLAS P. GODICI

*Attest:*

*Attesting Officer*  *Acting Director of the United States Patent and Trademark Office*